March 19, 1957 G. D. McKENZIE 2,785,522
PNEUMATIC INDIVIDUALLY DIRECTED COTTON HARVESTER
Filed Aug. 5, 1955 2 Sheets-Sheet 1
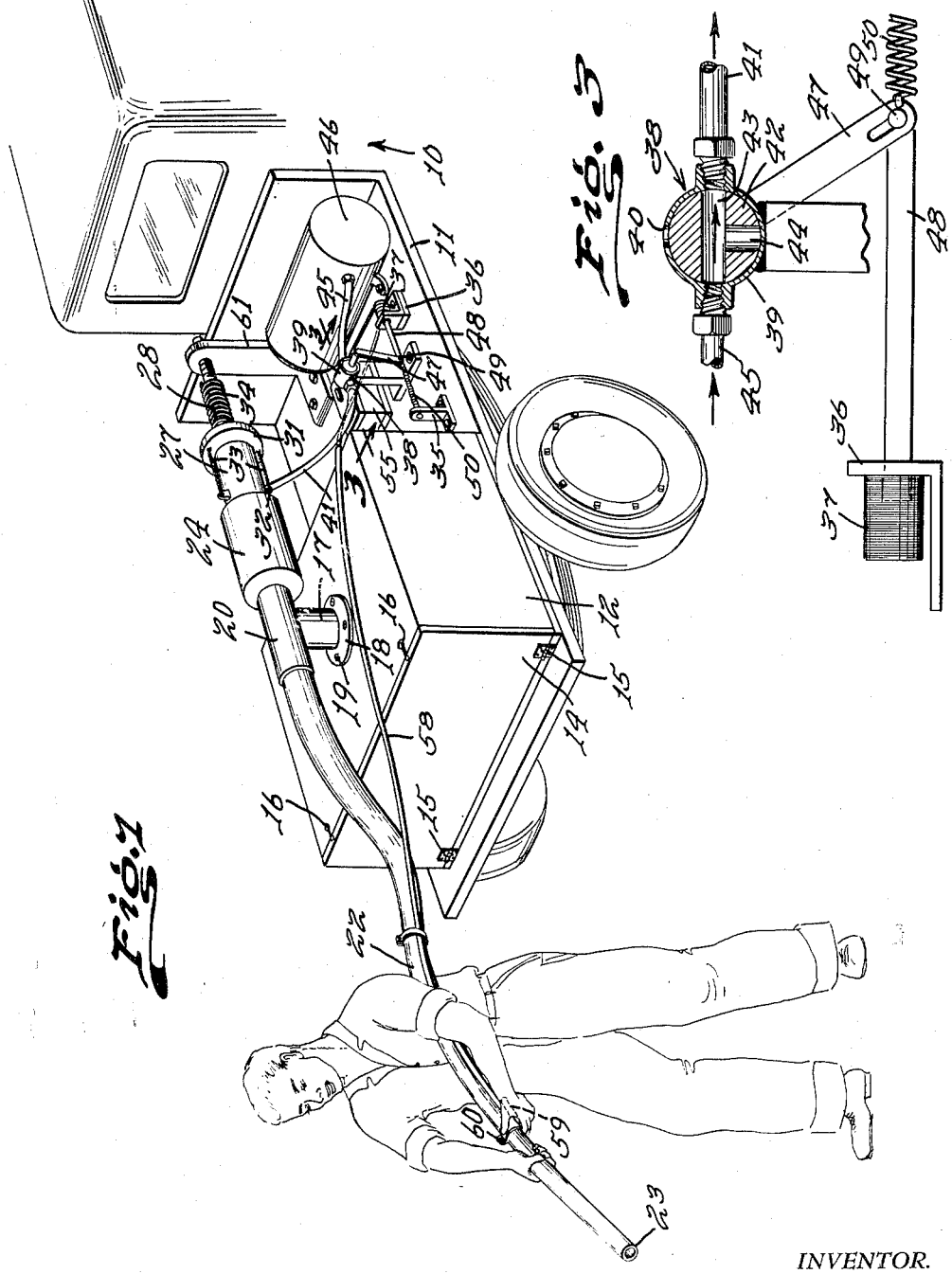
INVENTOR.
George Dewey McKenzie
BY Victor J. Evans & Co.
ATTORNEYS

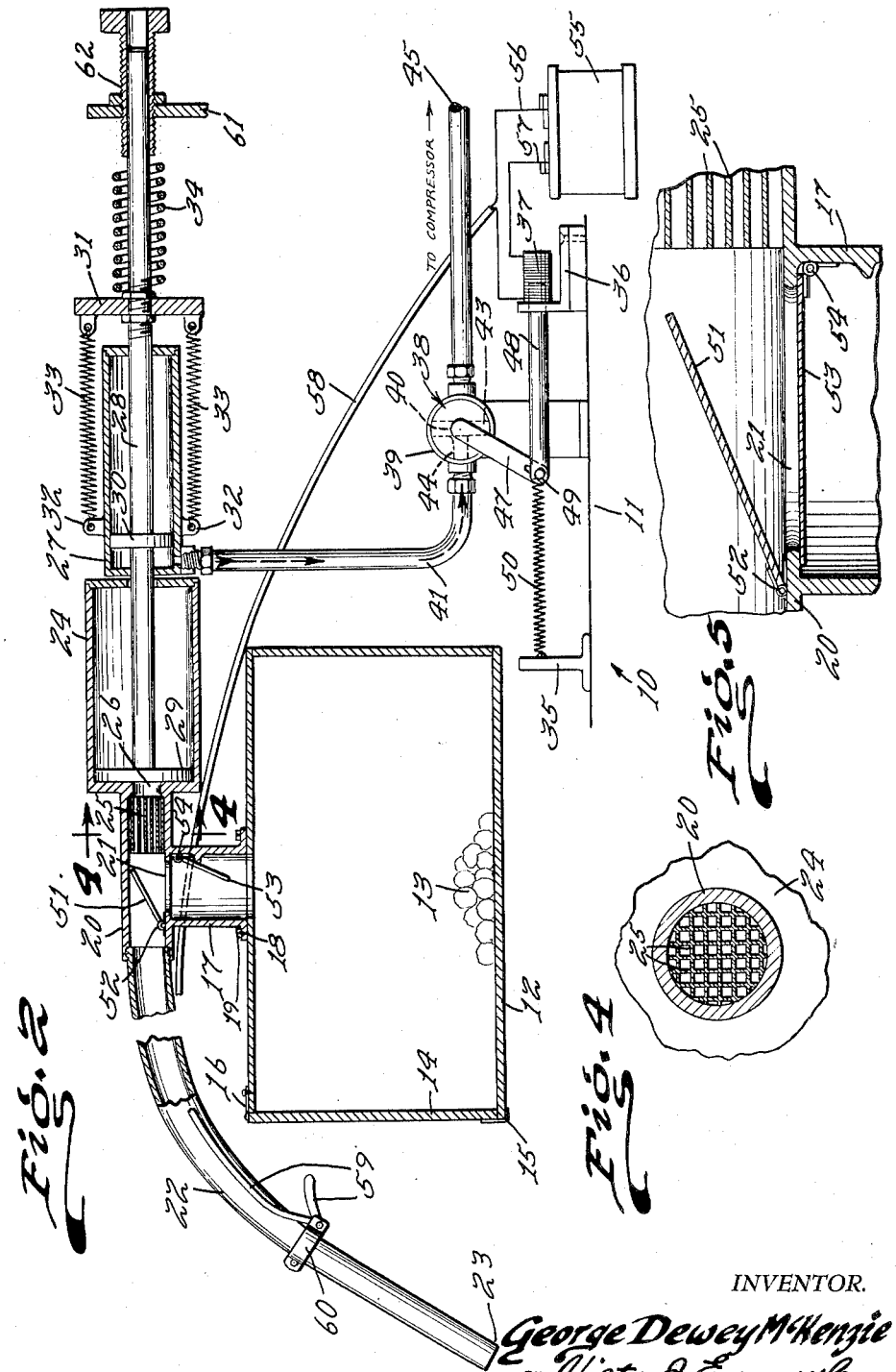

United States Patent Office 2,785,522
Patented Mar. 19, 1957

2,785,522

PNEUMATIC INDIVIDUALLY DIRECTED COTTON HARVESTER

George Dewey McKenzie, Evergreen, Ala.

Application August 5, 1955, Serial No. 526,665

4 Claims. (Cl. 56—31)

This invention relates to agricultural equipment, and more particularly to a cotton picking machine.

The object of the invention is to provide a machine which will facilitate the removal of cotton bolls from growing plants or the like.

Another object of the invention is to provide a cotton picking machine which includes a mobile unit such as a truck or trailer, and whereby there is provided a hopper or housing for receiving the picked cotton, there being a means for creating a source of suction or vacuum so that the cotton can be readily removed from the plants and caused to be deposited in the hopper.

A further object of the invention is to provide a cotton picking machine which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view of the cotton picking machine of the present invention.

Figure 2 is an enlarged fragmentary elevational view, with parts broken away and shown in section, of the cotton picking machine shown in Figure 1.

Figure 3 is an enlarged sectional view taken on the line 3—3 of Figure 1.

Figure 4 is an enlarged sectional view taken on the line 4—4 of Figure 2.

Figure 5 is an enlarged fragmentary view of the valve structure shown in Figure 2.

Referring in detail to the drawings, the numeral 10 designates a truck which may have a base or support member 11 mounted thereon, Figure 1, and mounted on the support member 11 is a hopper or housing 12 which is hollow, Figure 2. The housing 12 is provided with a door 14, and the door 14 may be hingedly mounted by means of hinges 15, there being hooks or latches 16 for maintaining the door 14 in closed position. By opening the door 14, access can be had to the interior of the housing 12 so that the cotton 13 can be removed therefrom.

Extending upwardly from the top of the housing 12 is a neck 17, and the neck 17 is provided with a lower flange 18 which may be secured to the housing by means of bolts or suitable securing elements 19. There is further provided at the top of the neck 17 a tube 20, and an opening 21 establishes communication between the tube 20 and neck 17.

A hose 22 has one end connected to the tube 20, and one end 23 of the hose 22 is adapted to be arranged or held contiguous to the growing cotton plants so that the cotton can be removed by suction or vacuum as later described in this application.

There is further provided a first cylinder 24 which may be secured to the tube 20 in any suitable manner, and a plurality of bars or elements 25 are arranged in crisscross relation with respect to each other and these elements 25 are positioned in the tube 20, Figures 2 and 4. An opening 26 establishes communication between the tube 20 and the interior of the cylinder 24. Arranged contiguous to an end of the cylinder 24 is a second cylinder 27, and a rod 28 is reciprocably mounted in the cylinders 27 and 24. A piston 29 is mounted on an end of the rod 28 within the cylinder 24, and a smaller piston 30 is also mounted on the rod 28 and positioned in the cylinder 27.

Mounted on the rod 28 is a collar 31, and extending outwardly from the cylinder 27 are apertured ears 32. Coil springs 33 extend between the ears 32 and collar 31. A spring member 34 is also circumposed on the rod 28 and abuts the collar 31.

Extending upwardly from the support member 11 is a pair of brackets 35 and 36, and a solenoid 37 is supported by the bracket 36. There is further provided a valve member 38 which is shown in detail in Figure 3. The valve member 38 includes an outer stationary casing 39 which is provided with a port 40, there being a conduit 41 connecting the casing 39 to the cylinder 27. Rotatably mounted in the casing 39 is a core 42 which is provided with passageways 43 and 44. A conduit 45 connects the valve member 38 to a tank 46 which is adapted to hold a quantity of compressed air, and a suitable air compressor is used for supplying air to the tank 46.

The solenoid 37 is adapted to be used for actuating the valve member 38, and an arm 48 extends from the solenoid 37 and is pivotally connected to a lever 47 by means of a pivot pin 49, the lever 47 being pivotally connected to the core 42. A coil spring 50 extends between the arm 48 and bracket 35.

There is further provided a check valve 51 which is mounted for movement into and out of closing relation with respect to the opening 21, and the check valve 51 may be hingedly connected to the tube 20 by means of a hinge 52. A second check valve 53 may be hingedly connected to the neck 17 by means of a hinge 54, and the valve 53 is also mounted for movement into and out of closing relation with respect to the opening 21, Figure 5.

The numeral 55 designates a conventional storage battery which may have wires 56 and 57 leading therefrom, and these wires may lead to the solenoid 37, there being a cable 58 leading from these wires, and one end of the cable 58 may be secured to the hose 22 by means of a clamp 60. A trigger 59 is provided whereby when the trigger 59 is manually actuated, the circuit to the solenoid 37 will be completed so that the arm 48 can be reciprocated in order to properly position the core 42 of the valve member 38. A brace 61 may extend upwardly from the support member 11, and the brace 61 may support a sleeve 62 which slidably receives therein an end of the rod 28.

From the foregoing, it is apparent that there has been provided a cotton picking machine which is an improvement over the cotton picking machine shown and described in my pending application, Serial No. 380,541, filed September 16, 1953, and now Patent 2,736,151. In use, the vehicle 10 may be driven to any suitable location in a cotton field, and then the compressor can be actuated so as to build up air pressure in the tank 46. Then, the end 23 of the hose 22 is held in the hands, as shown in Figure 1, adjacent to the cotton plants and by pressing on the trigger 59, the cable 58 will cause the solenoid 37 to be energized. With the solenoid 37 energized, the arm 48 will be moved and this will cause movement of the lever 47 whereby the core 42 can be shifted so as to cause the ports or passageways 44 and 43 to register with the proper conduits. Thus, with the core 42 positioned as shown in Figure 3, air from the compressor tank 46 can flow from the conduit 45, through the passageway 43, then through the conduit 41 into the interior of the cylinder 27 to force the piston 30 from left to right, Figure 2. As the piston 30 moves from left to right, it moves the rod 28 from left to right, Figure 2, and this in turn moves the piston 29 in the cylinder 24 from left to right. Thus, the piston 29 will create a vacuum or suction so that the cotton will be sucked up through the open end 23 of the hose 22 and this cotton will impinge against the elements 25. Then, when pressure on the trigger 59 is released, the coil spring 50 will return the parts to the position shown in Figure 2 so that the air from the cylinder 27 will bleed back from the cylinder 27 through the conduit 41 out through the port 40. Thus, the piston 29 can move from right to left so that the vacuum will be broken and the valve 51 can move upwardly as shown in Figure 2 and the valve 53 can move downwardly whereby the cotton which is against the elements 25 can fall through the opening 21 down through the neck 17 and into the housing 12 so that the cotton 13 will assume the position shown in Figure 2. The valve 53 can move up against the bottom of the opening 21 as shown in Figure 5 when there is a vacuum in the system. The cotton 13 can be removed from the housing 12 by opening the door 14.

The machine of the present invention can be operated with a minimum of effort on the part of the operator and the device pulls in a measured amount of air but does not keep on pulling in air even if the trigger is held down. This is important since the apparatus will not pull in a lot of trash along with the cotton. Also, the amount of air pulled in can be regulated and by raising or lowering the pressure of the air supply, the suction can be regulated. The assembly is semi-automatic since when the trigger is pressed in, the air is pulled in for a fraction of a second. The collar 31 acts as a stop member which can be adjusted so that the length of the stroke of the rod 28 can be varied as desired. The machine only draws in a measured amount of air with each ball of cotton. The spring 50 returns the valve 38 to neutral position after actuation of the solenoid. The spring 34 is a recoil spring which helps cushion the movement of the pistons. The springs 33 serve to return the pistons to the front of the cylinders. The battery 55 furnishes power to operate the solenoid. The various conduits can be made of flexible material.

Thus, when the spout 23 is held close to the cotton bolls, and the trigger 59 is pressed, the solenoid 37 will open the valve 38 so that the compressed air from the tank 46 can enter the cylinder 27 to cause the piston 30 to move from left to right, Figure 2. This causes the piston 29 to move from left to right so that air is drawn in through the nozzle 23 and through the hose 22. This causes the cotton to be drawn up the hose 22 past valve 51 and the cotton abuts or impinges the screen elements 25. When the trigger 59 is released, the electric current is shut-off to the solenoid 37 and the spring 50 closes the valve 38 permitting air to escape from the cylinder 27. The springs 33 return the pistons to their original starting positions so as to expel the air and cotton out through the opening 21 and into the hopper 12.

I claim:
1. In a cotton picking machine, a mobile support member, a housing mounted on said support member and adapted to receive cotton therein, a neck extending upwardly from said housing, a tube connected to the upper end of said neck, a hose having one end connected to said tube, said tube having an opening establishing communication between said tube and neck, a pair of hingedly mounted check valves mounted one on said neck and one on said tube for movement into and out of bridging relation with respect to said opening, a plurality of bars arranged in crisscross relation in said tube, a first cylinder secured to said tube, a second cylinder arranged contiguous to said first cylinder, a rod reciprocably arranged in said cylinders, a piston positioned in each of said cylinders and mounted on said rod, a pair of apertured ears extending outwardly from said second cylinder, and a collar mounted on said rod, resilient means extending between said collar and ears, a coil spring circumposed on said rod and abutting said collar, a conduit leading from said second cylinder, a valve member connected to said conduit and including an outer stationary casing, and an inner movable core provided with passageways therein, a lever pivotally connected to said core, an arm pivotally connected to said lever, a solenoid for causing movement of said arm, and a manually operable trigger for controlling actuation of said solenoid.

2. The structure as defined in claim 1, and further including a tank for holding compressed air, and said tank being connected to said valve member.

3. In a cotton picking machine, a mobile support member, a housing mounted on said support member and adapted to receive cotton therein, a neck extending upwardly from said housing, a tube connected to the upper end of said neck, a hose having one end connected to said tube, said tube having an opening establishing communication between said tube and neck, a pair of hingedly mounted check valves mounted one on said neck and one on said tube for movement into and out of bridging relation with respect to said opening, a plurality of bars arranged in crisscross relation in said tube, a first cylinder secured to said tube, a second cylinder arranged contiguous to said first cylinder, a rod reciprocably arranged in said cylinders, a piston positioned in each of said cylinders and mounted on said rod, a pair of apertured ears extending outwardly from said second cylinder, a collar mounted on said rod, resilient means extending between said collar and ears, a coil spring circumposed on said rod and abutting said collar, a conduit leading from said second cylinder, a valve member connected to said conduit and including an outer stationary casing and an inner movable core provided with passageways therein, a lever pivotally connected to said core, an arm pivotally connected to said lever, a solenoid for causing movement of said arm, manually operable means including a trigger for actuating said solenoid, a tank for holding compressed air connected to said valve member, a door hingedly connected to said housing, said resilient means comprising a pair of coil springs.

4. In a cotton picking machine, a mobile support member, a housing mounted on said support member and adapted to receive cotton therein, a neck extending from said housing, a tube connected to said neck, a hose connected to said tube, said tube having an opening establishing communication between said tube and neck, a pair of hingedly mounted check valves mounted one on said neck and one on said tube for movement into and out of bridging relation with respect to said opening, a plurality of bars arranged in said tube, a first cylinder secured to said tube, a second cylinder arranged contiguous to said first cylinder, a rod reciprocably arranged in said cylinders, a piston positioned in each of said cylinders and mounted on said rod, ears extending outwardly from said second cylinder, a collar mounted on said rod, resilient means extending between said collar and ears, a coil spring circumposed on said rod and abutting said collar, a conduit leading from said second cylinder, a valve member connected to said conduit and including an outer casing, an inner movable core provided with passageways therein, a lever pivotally connected to said core, an arm pivotally connected to said lever, a solenoid for causing movement of said arm, and manually operable means for controlling actuation of said solenoid.

References Cited in the file of this patent

UNITED STATES PATENTS

| | | |
|---|---|---|
| 767,058 | Harvin | Aug. 9, 1904 |
| 773,357 | Webb | Oct. 25, 1904 |
| 1,750,541 | Preston | Mar. 11, 1930 |